INVENTORS
ADOLF SCHOEPE,
HARLEY N. KLENTZ
BY
MAHONEY & HORNBAKER
ATTORNEYS

Nov. 4, 1969

A. SCHOEPE ET AL  3,476,200
INTERCHANGEABLE WHEEL SUSPENSION SYSTEM IN
A FOUR-WHEEL DRIVE VEHICLE

Filed Oct. 3, 1967  4 Sheets-Sheet 4

INVENTORS
ADOLF SCHOEPE,
HARLEY N KLENTZ
BY
MAHONEY & HORNBAKER
ATTORNEYS

United States Patent Office 3,476,200
Patented Nov. 4, 1969

3,476,200
INTERCHANGEABLE WHEEL SUSPENSION SYSTEM IN A FOUR-WHEEL DRIVE VEHICLE
Adolf Schoepe, 1620 N. Raymond Ave., Fullerton, Calif. 92631, and Harley N. Klentz, Chino, Calif.; said Klentz assignor to said Schoepe
Filed Oct. 3, 1967, Ser. No. 672,580
Int. Cl. B62d 7/00; B60k 17/00, 23/00
U.S. Cl. 180—44                                    4 Claims

ABSTRACT OF THE DISCLOSURE

Each system has a central spindle bell housing functionally vertically symmetrical and reversible, except for a forward or rearward projecting steering bracket. Vertical reversal of one housing of a wheel set projects both housing steering brackets in one direction adapted for connection to the vehicle steering system where the set is steerable or securement to the vehicle frame where the set is nonsteerable. Each bell housing is axially within a wheel having an outer wheel support rotatably mounting the wheel and upper and lower king pin connections operably connected to the frame through suspension arms. Each bell housing is adapted for receiving a universal drive connection therethrough for driving connection outward to the wheel and inward to a differential connected drive shaft.

BACKGROUND OF THE INVENTION

This invention relates to an interchangeable wheel suspension system for vehicles wherein each wheel suspension system is interchangeable with any other wheel suspension system on the vehicle without regard as to right-hand or left-hand positioning, whether or not the wheel thereof must be steerable, or whether or not the wheel thereof must be driven. The wheel suspension system of the present invention is, therefore, adapted for use with vehicles having virtually any number of wheels, any number of sets of steerable wheels and any number of sets of driven wheels. Furthermore, each wheel suspension system may include vertical king pin connection for vastly improved wheel suspension and control and may also include the positioning of the king pin connections totally axially within the wheel and close to the wheel vertical axis for vastly improved wheel turning control by greatly reducing the wheel turning scuff radius.

To our knowledge, prior to the present invention, the various separate wheel suspension systems of prior vehicles have been different, one from the other, where certain sets of the vehicle wheels must be steerable and certain sets thereof must be driven, such as in various forms of modern motor driven vehicles. For instance, even assuming a four wheeled vehicle having four wheel drive and front wheel steering, the front wheel suspension systems have been different since each must be steerable from a different side, and the rear wheel suspension systems have been different from the front wheel suspension systems since the rear wheels are not steerable and must be secured to the vehicle frame against any steering movement. As a result, each wheel suspension system of a modern four wheeled vehicle has had a large number of the parts thereof which are different from any other wheel suspension system of such vehicle, necessitating a large number of replacement parts and increased costs, even in original manufacture, for providing such separate parts.

An additional factor with most prior vehicle wheel suspension systems is that the king pin connections thereof for providing wheel support on the vehicle frame and wheel turning movement have been angled king pin connections, that is, the king pin connections have been angled relative to the vertical centerline axis of the particular wheel. With such angled king pin connection, the higher an impact or resistance to turning rises on the wheel, the greater the mechanical disadvantage is created in the wheel suspension system, resulting in greater part strain with decreased steering and wheel suspension control.

Still another factor with prior vehicle wheel suspension systems has been the fact that the king pin connections of a particular steerable wheel have been spaced inwardly a distance from said wheel so as to provide a relatively large turning or scuff radius for the wheel. Such mounting of the prior steerable wheels has been inherent in the particular construction of the suspension systems therefor, such suspension systems being relatively large and not being sufficiently compact for mounting the portions thereof having the king pin connections axially enclosed by the wheels. The maximum efficiency of wheel suspension control and steering control has, therefore, not been provided so as to create many obvious disadvantages.

OBJECTS AND SUMMARY OF THE INVENTION

It is, therefore, an object of our invention to provide an interchangeable wheel suspension system for vehicles which is adapted for complete interchangeability, regardless of whether the wheels are steerable or nonsteerable, driven or nondriven, or left- or right-hand wheels. Each wheel suspension system has an identical central spindle bell housing which is functionally vertically symmetrical and reversible, except for a steering bracket projecting one of forwardly and rearwardly therefrom. One of the bell housings of a set of wheels may, therefore, be vertically reversed so that both the steering brackets of the set extend either forwardly or rearwardly, a steerable set of wheels having the steering brackets connected to the vehicle steering system and a nonsteerable set of wheels having the steering brackets thereof secured to the vehicle frame against any side turning movement.

In addition, each of the bell housings has king pin connections at upper and lower portions thereof for operable connection to suspension arms vertically movably supporting the particular wheel suspension system on the vehicle frame. The king pin connections, of course, permit side turning movement of the bell housing for steering movement of a wheel rotatably supported outwardly of the bell housing where the particular wheel is to be steerable.

Also, each bell housing is adapted for mounting a universal drive connection centrally therethrough, said universal drive connection being adapted for outward driving connection to the wheel and inward driving connection to the drive axle of the vehicle drive system where the particular wheel is to be driven, and said universal drive connection permitting preferably both vertical and steering movement of the bell housing and its supported wheel.

It is still another object of our invention to provide an interchangeable wheel suspension system for vehicles of the foregoing type wherein the king pin connections to the bell housing, and therefore the wheel, are preferably vertical king pin connections which are vertically aligned lying in a vertical plane passing through the vertical centerline of the wheel. Such positioning of the king pin connections on the bell housing not only provides the maximum of convenience in vertical reversibility of the bell housing, but equally as important, provides the maximum strength and efficiency of wheel suspension and steering controllability. Furthermore, such vertical king pin connections eliminate the disadvantages of the prior angled king pin connections previously discussed.

It is also an object of our invention to provide an interchangeable wheel suspension system for vehicles of the foregoing type wherein the bell housing is preferably totally axially within the wheel, thereby placing the king pin connections as close as conveniently possible to the vertical turning centerline of the wheel. This reduces the turning radius or scuff radius of the wheel and adds even further to the wheel turning controllability. Both the previously described vertical king pin connections and this reduction in wheel turning radius additionally eliminate many points of wear and stress in the wheel suspension system which has been present in the prior constructions.

Other objects and advantages of the invention will be apparent from the following specification and the accompanying drawings which are for the purpose of illustration only.

DESCRIPTION OF THE BEST EMBODIMENT CONTEMPLATED

Figure 1:
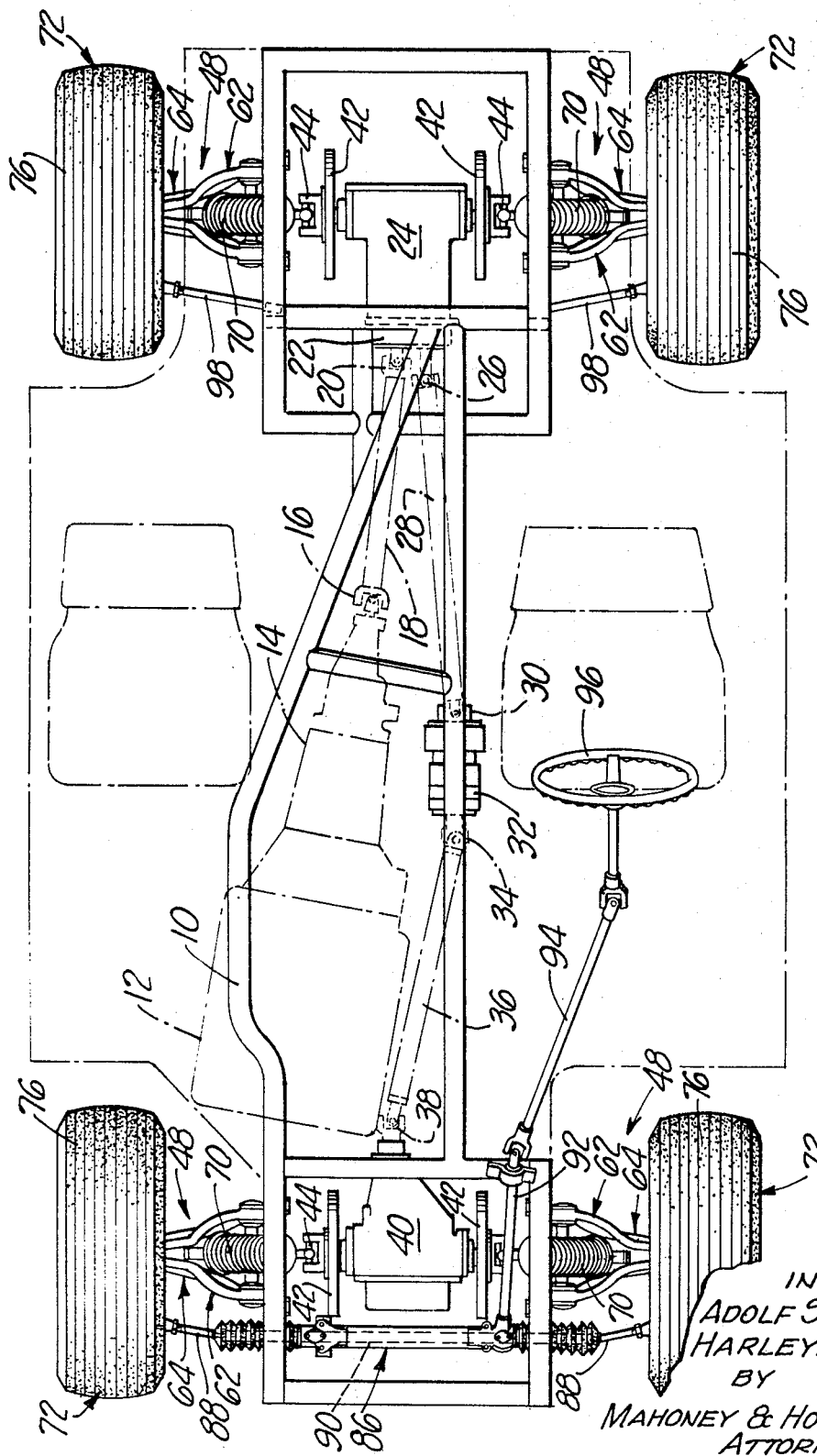
FIG. 1 is a bottom plan view of a front steering, four wheel drive vehicle incorporating the interchangeable wheel suspension system of the present invention, a portion of the vehicle being shown in phantom lines in order to more clearly show the details of the mounting and control of the various wheel suspension systems.

Referring to FIG. 1 of the drawings, there is illustrated therein a front steerable four-wheel drive vehicle incorporating the interchangeable wheel suspension system of the present invention and illustrating one application thereof. As shown, the vehicle includes a tubular frame 10 supporting a driving engine 12, which engine extends generally longitudinally of the frame at a slight angle relative to said frame. The angled mounting of the engine 12 is for convenience in providing the four wheel drive system of the vehicle, as will be hereinafter described and is not vital to the principles of the present invention.

The engine 12 is connected rearwardly through a usual transmission 14 and universal joint 16 to a main rearwardly extending drive shaft 18, said shaft being rearwardly connected through a universal joint 20 to a transfer gear assembly 22. The transfer gear assembly 22 is mounted on a forward face of a center mounted rear differential 24 connected for transferring rotative force rearwardly into said differential and forwardly through a universal joint 26 into a first auxiliary drive shaft 28. A forward end of the first auxiliary drive shaft 28 is connetced through a universal joint 30, a usual windup preventing clutch 32 and another universal joint 34 to a second auxiliary drive shaft 36.

Finally, a forward end of the second auxiliary drive shaft 36 is connected through a universal joint 38 to a forward differential 40 for supplying rotative power thereto. In view of the angular arrangement of the first and second auxiliary drive shafts 28 and 36, the forward differential 40 may likewise be laterally centrally positioned relative to the frame 10. Thus, the engine 12 is connected for driving the rear and forward differentials 24 and 40 simultaneously, thereby providing properly located power take-offs of differential form for the four wheel drive system of the vehicle.

Each of the rear and forward differentials 24 and 40 is oppositely, laterally connected through usual disc brake assemblies 42 and universal joints 44 to oppositely, laterally extending drive axles 46, outer ends of said drive axles being operably connected to the forward and rearward sets of interchangeable wheel suspension systems of the present invention, generally indicated at 48. As hereinbefore discussed, the wheel suspension systems 48 are completely interchangeable and in the present case, in view of the vehicle four wheel drive, are identical, except for certain reversibility of parts, as will be hereinafter discussed. In view thereof, a detailed description of one of the wheel suspension systems 48 will suffice for all, the right front wheel suspension system having been chosen and being shown in enlarged detail in FIGS. 2, 3 and 4.

Figure 2:
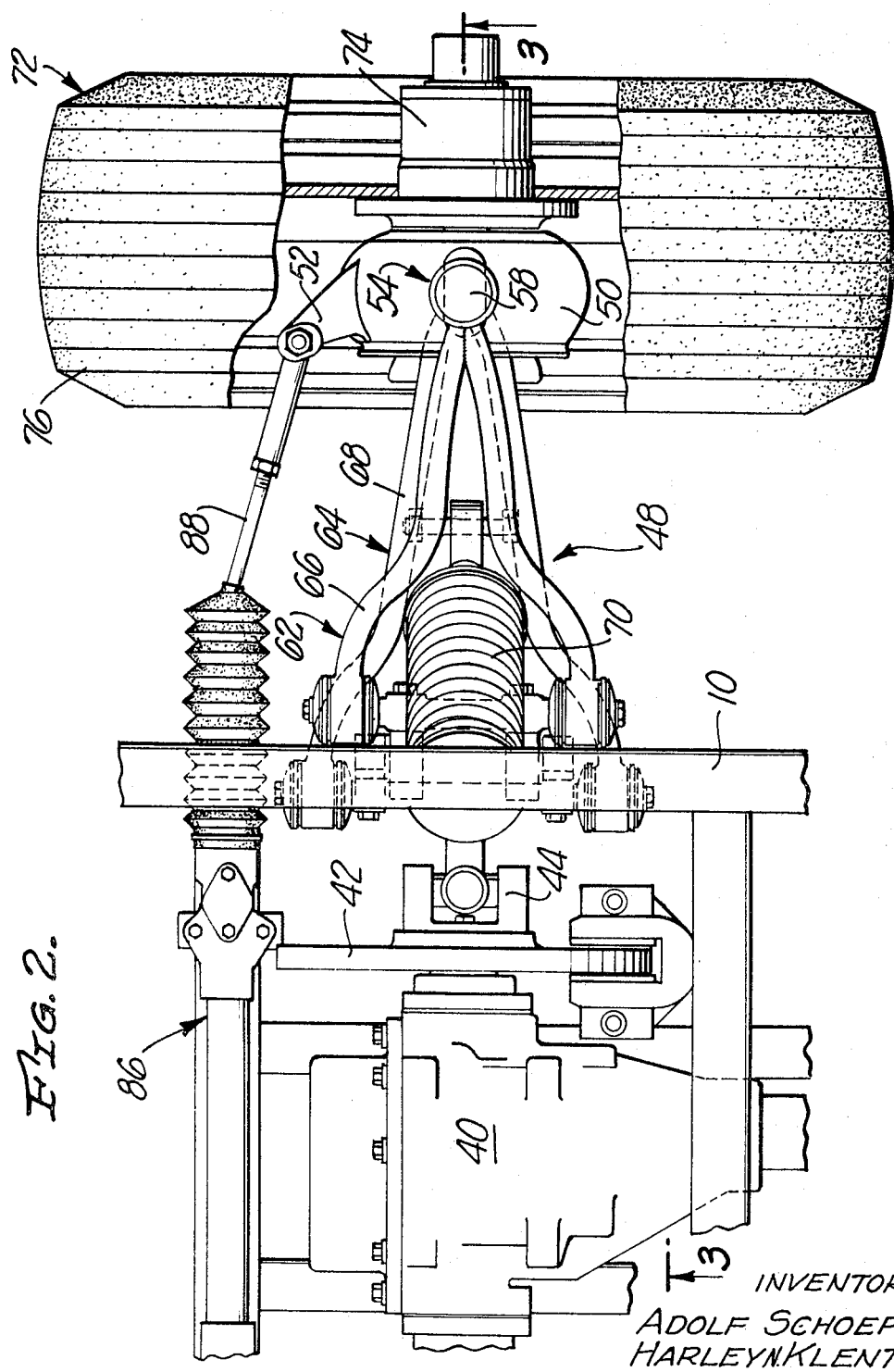
FIG. 2 is an enlarged, fragmentary, bottom plan view of the right front portion of the vehicle of FIG. 1 including the right front wheel suspension system assembly.
Figure 3:
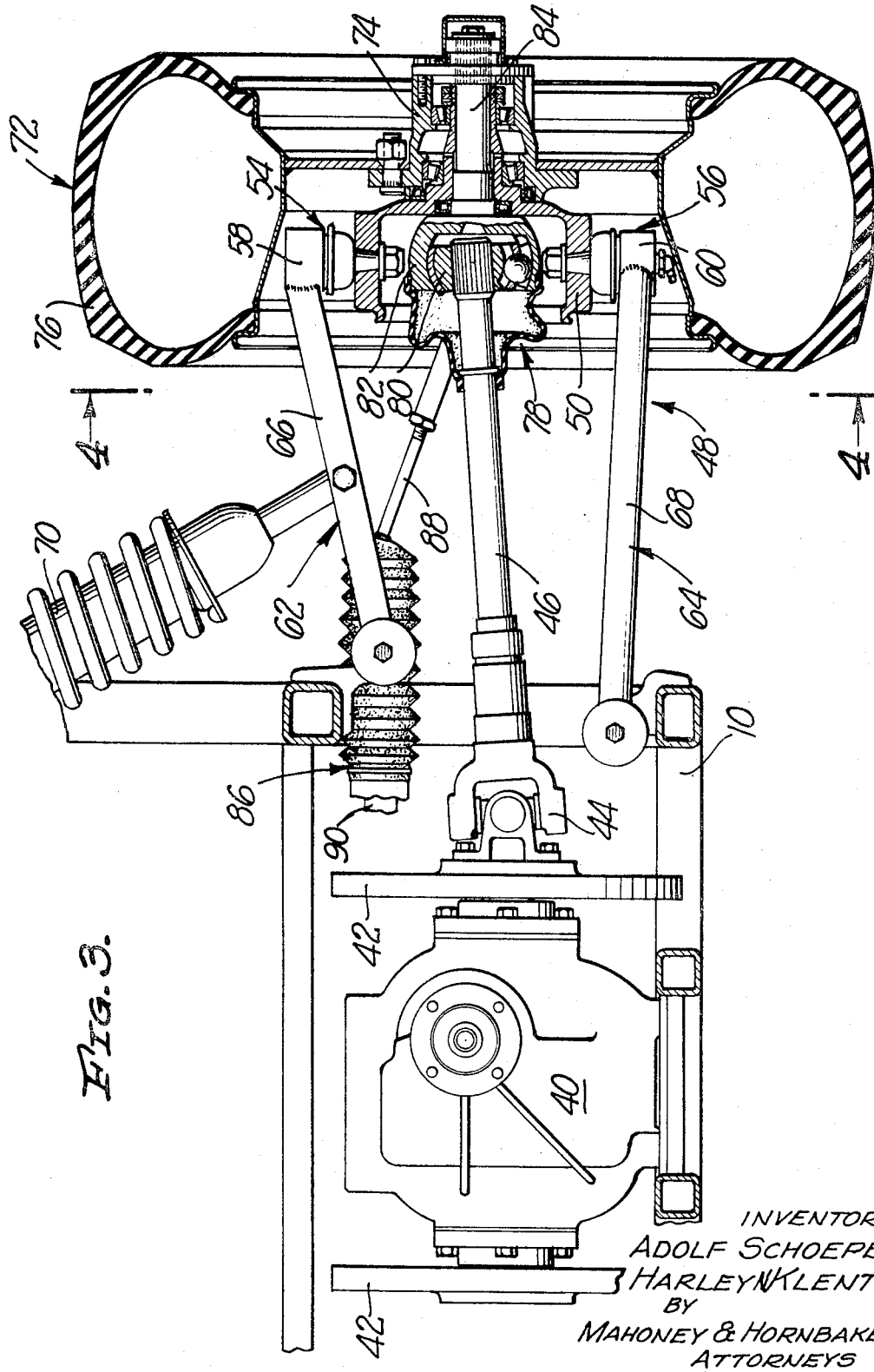
FIG. 3 is a fragmentary, vertical, sectional view looking in the direction of the arrows 3—3 in FIG. 2.
Figure 4:
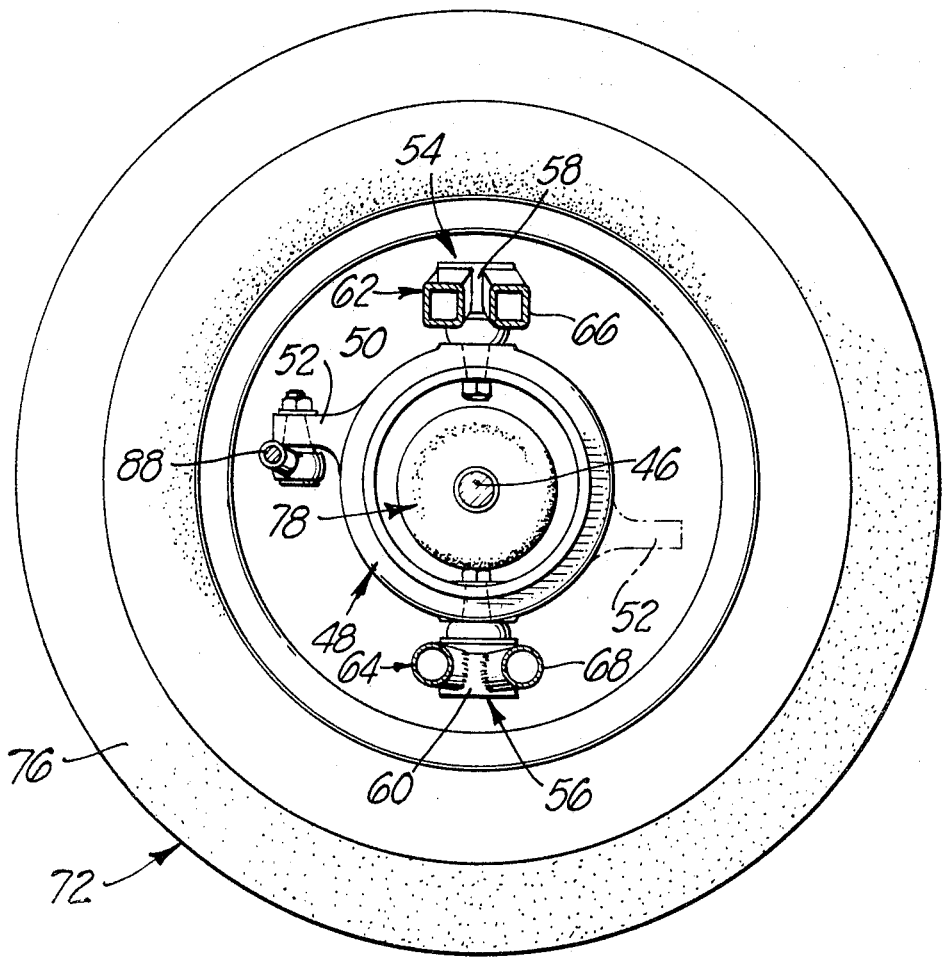
FIG. 4 is a vertical, sectional view looking in the direction of the arrows 4—4 in FIG. 3 and showing a steering bracket of a central bell housing in phantom lines to illustrate the positioning of said steering bracket when said bell housing is vertically reversed.

Referring to FIGS. 2, 3 and 4, the wheel suspension system 48 includes a laterally centrally hollow, functionally vertically symmetrical and reversible, central spindle bell housing 50 having a forwardly or rearwardly, in this case, forwardly projecting steering bracket 52. Due to the functional vertical symmetry of the bell housing 50, with the exception of the steering bracket 52, the bell housing may be positioned with the steering bracket extending either forwardly or rearwardly, as desired. Such, therefore, permits connection to the steering bracket 52 to be either forwardly or rearwardly of the lateral center of the bell housing 50 and permits the bell housings 50 at opposte sides of the vehicle to be positioned with the steering brackets 52 thereof extending in the same direction, all of which will be hereinafter further discussed.

An upper king pin connection, generally indicated at 54, is formed at an upper portion of the bell housing 50 and a lower king pin connection, generally indicated at 56, is formed at a lower portion of the bell housing. The upper and lower king pin connections 54 and 56 include the somewhate conventional, universally movable king pin assemblies 58 and 60 secured to the bell housing 50, said king pin assemblies being formed for supporting the bell housing while permitting both vertical and side turning movement of said bell housing. As shown best in FIG. 4 and important to certain of the principles of the present invention, it will be noted that the upper and lower king pin connections 54 and 56 are vertically aligned and on a vertical centerline of the bell housing 50 so that said king pin connections constitute vertical king pin connections.

The upper and lower king pin connections 54 and 56 are, in turn, secured to upper and lower suspension arm assemblies, generally indicated at 62 and 64, said suspension arm assemblies including conventional A-arms 66 and 68 vertically, pivotally connected to the frame 10 in the usual manner for vertically, pivotally supporting the wheel suspension system 48 on the frame.

The upper suspension arm assembly 62 also includes a combined coil spring and shock absorber 70 vertically, pivotally connected intermediate the A-arm 66 and extending angularly, upwardly for vertical, pivotal connection to the frame 10 so as to resiliently resist the vertical movement of the wheel suspension system 48 relative to the frame 10. It will be obvious that the particular form of the upper and lower suspension arm assemblies 62 and 64 are not particularly important to the principles of the present invention and any usual type of suspension arm assemblies could be used, such as torsion bar assemblies and the like, well known to those skilled in the art.

A wheel, generally indicated at 72, is rotatably secured at an outer side of the bell housing 50 to a hub 74, said wheel including a usual pneumatic tire 76. Again, it will be particularly noted and of importance to certain of the principles of the present invention, that the wheel 72 virtually completely laterally telescopes the bell housing 50 and king pin connections 54 and 56 so as to place the bell housing and king pin connections totally laterally within the wheel. This, therefore, places the wheel suspension system 48, with the exception of the portions of the upper and lower suspension arm assemblies 62 and 64, totally within the wheel 72 for reducing the turning scuff radius to a minimum, that is, for reducing the lateral distance to a minimum between the vertical turning centerlines of the king pin assemblies 58 and 60 and the longitudinal or forward and rearward centerline of the wheel.

The outer end of the drive axle 46 is drivingly secured to a universal drive connection assembly, generally indicated at 78, the bell housing 50, due to the laterally hollow configuration thereof, being adapted for receiving said universal drive connection assembly centrally, laterally therein and extending laterally therethrough. The universal drive connection assembly 78 is of a usual power transmitting form, including a ball portion 80 secured to the drive axle 46 and a socket portion 82 having a stub shaft 84 rotatably supported extending outwardly through the bell housing 50, outwardly spline connected to the hub 74 of the wheel 72. Thus, the universal drive connection assembly 78 not only transmits rotative power from the drive axle 46 to the wheel 72, but also permits both vertical and side turning movement of the wheel suspension system 48 and wheel 72 relative to the frame 10 during the rotative driving of the wheel.

Finally, the steering bracket 52 of the bell housing 50 is pivotally connected to a steering system, generally indicated at 86, the steering system being supported on the frame 10 forwardly of the drive axles 46, as best seen in FIGS. 1 and 2, so that the bell housing 50 is vertically oriented with the steering bracket extending forwardly therefrom. The steering system 86 includes an adjustable connecting arm 88 having an outer end pivotally connected to the steering bracket 52 and an inner end pivotally connected to a usual steering rack 90 extending laterally of the frame 10 and being laterally, movably operable by a geared steering arm 92, as shown in FIG. 1. The steering arm 92 is rotatable in the usual manner through a steering shaft 94 and steering wheel 96 so that rotation of the steering arm 92 moves the steering rack 90 laterally of the frame 10 to provide controlled side turning for the bell housing 50 and wheel 72.

As hereinbefore pointed out, the right front wheel suspension system 48 has been chosen for detailed illustration and description in view of the fact that all of said wheel suspension systems are virtually identical. Thus, the only difference between the left front wheel suspension system 48 and that just described is the fact that the bell housing 50 is vertically reversed so that both steering brackets 52 of the two front wheel suspension systems will extend forwardly of the frame 10 and be in proper position for mutual connection to the steering system 86. As shown in FIG. 1, in view of the fact that the rear wheels 72 of the vehicle are not turnable or steerable, although both bell housings 50 of said wheel suspension systems are positioned with the steering brackets 52 thereof extending forwardly, such steering brackets are secured to the frame 10 through similar adjustable connecting arms 98 retaining the rear wheel suspension systems and wheels against turning movement.

Obviously, since all of the wheel suspension systems 48 are completely interchangeable, if it were desired to also provide the rear set of wheels 72 steerable, such could be done by connection thereof similar to that described for the front set of wheels. Furthermore, if it were desired to drive only one set of wheels 72, either the forward or rearward set thereof, the nondriven set would not require at least the major portion of the universal drive connection assemblies 78 and the wheels thereof would only be rotatably mounted on the outer sides of the bell housings 50, with the inner sides of the said bell housings being covered in the usual manner.

Thus, according to the principles of the present invention, completely interchangeable wheel suspension systems 48 are provided, any set of which may be driven or nondriven, or steerable or nonsteerable, depending on the particular vehicle. Further, each wheel suspension system 48 is provided with vertical king pin connection by the upper and lower king pin connections 54 and 56 on the bell housing 50 so as to provide maximum controllability and minimum wear of the wheel suspension system. Also, in each case, the wheel suspension system 48 is positioned substantially totally within the particular wheel 72 to place the vertical turning axis of the wheel suspension system, that is, the vertical axis of the upper and lower king pin connections 54 and 56, as close as conveniently possible to the vertical turning axis of the contact surface of the wheel 72, thereby reducing the turning scuff radius to a minimum, again increasing turning controllability.

Still a further inherent advantage of the interchangeable wheel suspension systems 48 of the present invention is the fact that in use of said wheel suspension systems on a particular vehicle, the resulting vehicle is provided with far improved stability and traction. As is apparent from the overall plan of vehicle shown in FIG. 1, the entire drive to the wheel suspension systems 48 is supported directly on the frame 10, including the rear and forward differentials 24 and 40, the drive shaft connection thereto from the engine 12 and the drive axles 46 between said differentials and the wheel suspension systems. Thus, only the individual wheel suspension systems 48 are supported by the spring and shock absorbers 70 completely free from the weight or weights of the drive systems thereto, as in the conventional vehicle and with the conventional wheel suspension systems, thereby greatly reducing the "unsprung weight" of the vehicle and providing improved individual wheel control.

As a result, and inherent in the wheel suspension systems 48 of the present invention, far greater stability is provided for the vehicle through greater wheel control and less wheel bounce, even in addition to the stability improvements provided by the various features of the individual wheel suspension systems, as hereinbefore discussed. Furthermore, such greater wheel control and less wheel bounce insures vastly improved traction for the vehicle including the wheel suspension systems 48 of the present invention over anything possible with prior conventional vehicles.

We claim:

1. In a vehicle of the type having a main frame, a drive system on said main frame including at least one differential operably connected to oppositely depending drive axles, and a steering system; the improvements comprising forward and rearward sets of interchangeable transversely spaced wheel supporting means disposed, one on each side of said frame, each wheel supporting means including a substantially identical central spindle bell housing, said bell housing being shaped functionally symmetrical about a vertical and horizontal centerline disposed in the plane of the wheel so as to be substantially identically reversible about said vertical and horizontal centerlines, a steering bracket, said steering bracket projecting outwardly from one side of said bell housing in a direction away from said centerline, said steering bracket being integrally connected to said bell housing spaced from said horizontal centerline, substantially identical king pin connection means at upper and lower portions of said bell housing generally aligned with said vertical centerline and extending radially outwardly and in opposite directions from said housing, suspension arm means operably connected between said king pin connection means and said frame for vertically movably supporting said wheel supporting means on said frame while permitting side turning through said king pin connection means of said bell housing relative to said frame, wheel journalling means extending axially outwardly from the outer side of said bell housing for rotatably supporting a wheel thereon, one of said bell housings of each set being vertically reversed about said horizontal centerline from the other of said bell housings of said set with said steering bracket of each of said bell housings extending in the same direction, said steering bracket of one of said bell housings being above and said steering bracket of the other housing being below said horizontal centerline, each of said steering brackets of certain of said sets being operably connected to said steering system for selective side turning of said bell housings of said certain sets, said steering brackets of any set not connected to said steering system being secured to said frame and against side turning movement, and universal drive connection means centrally through each of said bell housings of at least one of said sets outwardly operably connected to said wheels and inwardly operably connected to said drive axles of said drive system for driving said wheels while permitting at least vertical movement of said bell housings relative to said frame and side turning of said bell housings where said bell housings are connected through said steering brackets to said steering system.

2. A vehicle as defined in claim 1 in which each of said steering brackets of said forward set is operably connected to said steering system for selective side turning of said bell housings of said forward set; in which each of said steering brackets of said rearward set is secured to said frame and against side turning movement; and in which said substantially identical king pin connection means at said bell housing upper and lower portions each include a ball joint having a tapered connecting stub secured extending vertically through a complementary opening in said bell housing.

3. In a set of interchangeable transversely spaced wheel supporting means disposed, one on each side of a vehicle frame, the combination of: each of said wheel supporting means of said set including a substantially identical central spindle bell housing, said bell housing being shaped functionally symmetrical about a vertical and horizontal centerline disposed in the plane of the wheel so as to be substantially identically reversible about said vertical and horizontal centerlines, a steering bracket, said steering bracket projecting outwardly from one side of said bell housing in a direction away from said centerline, said steering bracket being integrally connected to said bell housing spaced from said horizontal centerline, substantially identical king pin connection means at upper and lower portions of said bell housing generally aligned with said vertical centerline and extending radially outwardly and in opposite directions from said housing, suspension arm means operably connected to said king pin connection means adapted for vertically movably supporting said wheel supporting means on a vehicle frame while permitting side turning through said king pin connection means of said bell housing relative to said frame, wheel journalling means extending axially outwardly from the outer side of said bell housing for rotatably supporting a wheel thereon; one of said bell housings of said set being vertically reversed about said horizontal centerline from the other of said bell housings of said set with said steering bracket of each of said bell housings extending in the same direction, said steering bracket of one of said bell housings being above and said steering bracket of the other housing being below said horizontal centerline; and means on said steering brackets adapted for connection to a vehicle steering system when said wheel suspension system set is to be steerable and for connection to a vehicle frame when said wheel suspension system set is to be nonsteerable.

4. A set of wheel suspension systems as defined in claim 3 in which said substantially identical king pin connection means at said bell housing upper and lower portions each include a ball joint having a tapered connecting stub secured extending vertically through a complementary opening in said bell housing.

References Cited

UNITED STATES PATENTS

| | | |
|---|---|---|
| 1,780,370 | 11/1930 | Tenney. |
| 2,392,832 | 1/1946 | Buckendale _____ 180—44 |
| 2,455,429 | 12/1948 | Lucien. |
| 2,503,477 | 4/1950 | Gregory _____ 180—48 |
| 2,631,681 | 3/1953 | Utz et al. _____ 180—44 |
| 3,283,842 | 11/1966 | Watt _____ 180—43 X |

FOREIGN PATENTS 730,876   6/1955   Great Britain.

A. HARRY LEVY, Primary Examiner

U.S. Cl. X.R.

180—48, 73; 280—96.3, 106